United States Patent
Zhang et al.

(10) Patent No.: US 11,575,458 B2
(45) Date of Patent: Feb. 7, 2023

(54) SERVICE TRANSMITTING AND RECEIVING METHODS AND DEVICES FOR OPTICAL TRANSPORT NETWORK (OTN)

(71) Applicant: ZTE Corporation, Shenzhen (CN)

(72) Inventors: Yuanbin Zhang, Shenzhen (CN); Yan Yuan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 234 days.

(21) Appl. No.: 16/954,768

(22) PCT Filed: Dec. 24, 2018

(86) PCT No.: PCT/CN2018/123166
§ 371 (c)(1),
(2) Date: Jun. 18, 2020

(87) PCT Pub. No.: WO2019/128934
PCT Pub. Date: Jul. 4, 2019

(65) Prior Publication Data
US 2021/0091870 A1 Mar. 25, 2021

(30) Foreign Application Priority Data
Dec. 28, 2017 (CN) .......................... 201711463056.0

(51) Int. Cl.
*H04J 3/16* (2006.01)
(52) U.S. Cl.
CPC ..... *H04J 3/1664* (2013.01); *H04J 2203/0071* (2013.01); *H04J 2203/0091* (2013.01)

(58) Field of Classification Search
CPC ............ H04J 3/1664; H04J 2203/0071; H04J 2203/0091; H04J 3/1652; H04J 3/16; H04J 14/08
See application file for complete search history.

(56) References Cited

U.S. PATENT DOCUMENTS

| 9,313,563 B1 | 4/2016 | Mok |
| 9,473,832 B2 | 10/2016 | Mukhopadhyay |
| 2007/0076767 A1* | 4/2007 | Loprieno ................ H04J 3/076 370/539 |

(Continued)

FOREIGN PATENT DOCUMENTS

| CN | 101800912 A | 8/2010 |
| CN | 102098595 A | 6/2011 |
| EP | 2747318 A1 | 6/2014 |

OTHER PUBLICATIONS

International Search Report for corresponding application PCT/CN2018/123166 filed Dec. 24, 2018; dated Mar. 28, 2019.

(Continued)

*Primary Examiner* — Steven H Nguyen
(74) *Attorney, Agent, or Firm* — Cantor Colburn LLP

(57) ABSTRACT

The present application provides data transmitting and receiving methods and devices for an Optical Transport Network (OTN). The service transmitting method for the OTN includes that: Optical Data Unit (ODU) services are mapped into cells of a payload area of an OTN interface frame, the payload area including N cells with a fixed size, one cell being used for carrying one ODU service and N being an integer larger than or equal to 1; and the OTN interface frame is encapsulated and transmitted.

19 Claims, 4 Drawing Sheets

(56) References Cited

U.S. PATENT DOCUMENTS

| | | | |
|---|---|---|---|
| 2012/0134674 A1 | 5/2012 | Shin | |
| 2013/0028613 A1* | 1/2013 | Taki | H04J 3/1652 398/182 |
| 2014/0177452 A1* | 6/2014 | Loehr | H04L 61/2069 370/241.1 |
| 2014/0334503 A1* | 11/2014 | Dong | H04J 3/1664 370/466 |
| 2015/0222380 A1* | 8/2015 | Su | H04J 3/07 398/98 |
| 2017/0195077 A1* | 7/2017 | Su | H04B 10/27 |

OTHER PUBLICATIONS

European Search Report for corresponding application EP 18895040; Report dated Jan. 14, 2021.

ZTE Corporation, "A New model of OTN maping and multiplexing", International Telecommunication Union, Geneva, Dec. 5, 2014.

* cited by examiner

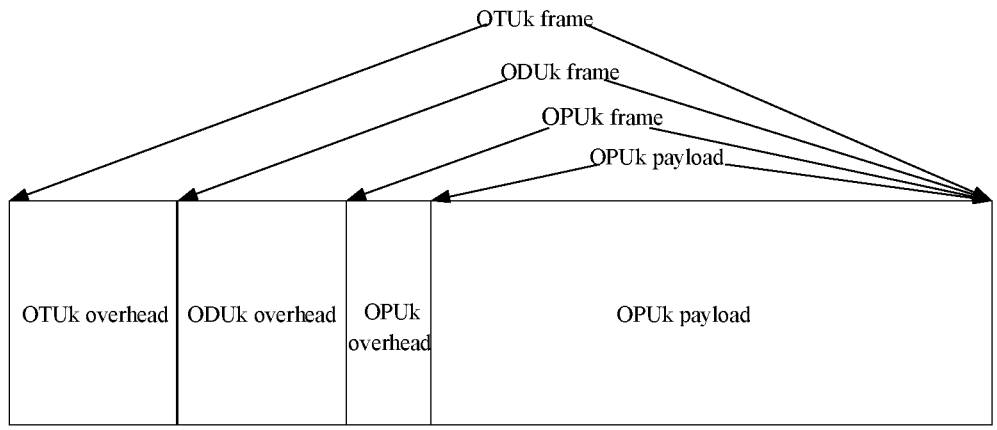
Fig. 1
| | 17 | 18 | 19 | 20 | 21 | 22 | 23 | 24 | 25...... | 3821 | 3822 | 3823 | 3824 |
|---|---|---|---|---|---|---|---|---|---|---|---|---|---|
| 1 | TS1 | TS2 | TS3 | TS4 | TS1 | TS2 | TS3 | TS4 | | TS1 | TS2 | TS3 | TS4 |
| 2 | TS1 | TS2 | TS3 | TS4 | TS1 | TS2 | TS3 | TS4 | | TS1 | TS2 | TS3 | TS4 |
| 3 | TS1 | TS2 | TS3 | TS4 | TS1 | TS2 | TS3 | TS4 | | TS1 | TS2 | TS3 | TS4 |
| 4 | TS1 | TS2 | TS3 | TS4 | TS1 | TS2 | TS3 | TS4 | | TS1 | TS2 | TS3 | TS4 |
Fig. 2
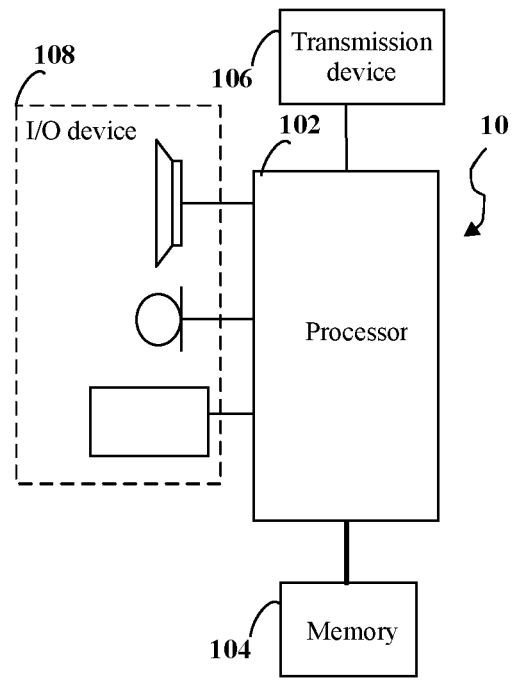
Fig. 3

SERVICE TRANSMITTING AND RECEIVING METHODS AND DEVICES FOR OPTICAL TRANSPORT NETWORK (OTN)

CROSS REFERENCE TO RELATED APPLICATIONS

The present application claims priority to Chinese Patent Application No. 201711463056.0, submitted to the China National Intellectual Property Administration on Dec. 28, 2017, the entire contents of which are incorporated herein by reference.

TECHNICAL FIELD

The present application relates to the field of communication, and for example, to service transmitting and receiving methods and devices for an OTN.

BACKGROUND

An Optical Transport Network (OTN) standard is a standard, set by the International Telecommunication Union Telecommunication Standardization Sector (ITU-T), for optical transport devices. At present, almost all long-distance transport networks are formed by OTN-standard-based devices.

An OTN has standard signal formats, including Optical Transport Unit k (OTUk) (k=1, 2, 3, 4), Flexible OTN (FlexO), and a new OTN signal that will be defined in the future. An OTN signal is configured to bear various non-OTN signals or multiple low-speed Optical Data Unit i (ODUi) (i=0, 1, 2, 2e, 3, 4, flex) signals. A rate of an ODUi is lower than a rate of an ODUk, and the low-speed ODUi (i<k) signal represents an ODUi signal of which a rate is lower than that of the ODUk in the present application. The non-OTN signals refer to various other signals except for OTN signals, for example, a Synchronous Digital Hierarchy (SDH) signal, an Ethernet signal, a fiber channel signal, and various packet signals. An OTN signal includes two parts, i.e., an overhead part and a payload part. The parts of the OTN signal are further described with an OTUk as an example. FIG. 1 is a schematic diagram of a frame structure of an OTUk according to a related art. As shown in FIG. 1, an OTUk signal is formed by an OTUk frame; The OTUk frame consists of an OTUk overhead and an ODUk frame; The ODUk frame consists of an ODUk overhead and an Optical Payload Unit k (OPUk) frame; The OPUk frame consists of an OPUk overhead and an OPUk payload; and the OPUk payload may be configured to bear a non-OTN signal or multiple low-speed ODUi (i<k) signals. A signal formed by an ODUk frame is called an ODUk signal.

In a related OTN signal definition, mapping methods for carrying a service signal to an OTN payload area for use mainly include Asynchronous Mapping Procedure (AMP), Bit-synchronous Mapping Procedure (BMP) and Generic Mapping Procedure (GMP). Use of BMP is greatly limited, namely it is required that an OTN signal and the service signal are completely synchronous in rate and a ratio of the rates of the OTN signal and the service signal complies with a specific relationship. For AMP and GMP, it is not required that the OTN signal and the service signal are synchronous in rate. Particularly, GMP is a main method for carrying the service signal in the OTN signal.

FIG. 2 is a schematic diagram of the division of an OPUk payload into four time slots in an optical transport standard according to the related art. As shown in FIG. 2, in a related OTN definition, a method for carrying multiple services signals in an OTN signal payload is to divide the OTN signal payload into n time slots and then bear the service signals in at least one time slot of the OTN signal payload, where the slot is implemented in a byte interleaving manner. For example, for an OTN signal OTUk, an OPUk payload is a byte block with 4 rows and 3,808 columns, where the columns are numbered from 17 to 3,824 (the first 17 columns correspond to an OTUk overhead, an ODUk overhead and an OPUk overhead) and the rows are numbered from 1 to 4. In FIG. 2, a small box represents one byte. An OPUk payload area of an OPUk frame is formed by 4*3,808 bytes that are arranged in 4 rows and 3,808 columns, as shown in FIG. 2. FIG. 2 shows the condition that the OPUk payload is divided into four time slots in the byte interleaving manner, namely four adjacent bytes form a group from column 17 in the 3,808 columns, and the four bytes in each group are divided to four different time slots TS1, TS2, TS3 and TS4 respectively, namely four continuous bytes from column 17 represent the four time slots respectively, and in such a manner, all the 4*3,808 bytes in the OPUk payload are divided into the four time slots named after TS1, TS2, TS3 and TS4 respectively. m time slots may bear one ODUi (m is smaller than the maximum number n of slots in the OPUk payload, and n=4 in FIG. 2).

According to a related OTN standard G.709, an OPU4 payload in a 100 G OTU4 is divided into 80 time slots. Since a minimum ODUk in an OTN is an ODU0 of which a rate is 1.25 G, an OPUk payload in an OTU frame of any rate should theoretically be divided into time slots according to a granularity (i.e., unit) of 1.25 G to ensure that the ODU0 may be most efficiently. However, when a rate of an OTUk is very high, for example, the rate of the OTU4 is 100 G, if the time slots are divided according to the granularity of 1.25 G, a large number of time slots may be required, for example, the OPU4 payload of the OTU4 is required to be divided into 80 time slots. Dividing into too many time slots brings more difficulties to hardware implementation of carrying of multiple low-speed ODUi (i<k) in the OTUk. In a signal format OTUCn of more than 100 G (n is an integer larger than or equal to 1), considering a related hardware level, a time slot granularity of the OTUCn is 5 G rather than 1.25 G. However, in such case, if an ODUi of which a rate is lower than 5 G is in the OTUCn, the space may be wasted, and a fixed slot size also limits the number of services that may be in an ODU. In addition, some operating companies do not maintain SDH devices anymore, some small-bandwidth services (less than 1 G) also require transitions from the SDH devices to OTN devices, but time slot granularities of the related OTN devices are minimally 1.25 G, and direct carrying causes serious bandwidth waste, so that it is also desirable to improve a related OTN technology.

For the condition of the serious bandwidth waste caused by transporting an optical transport service in a manner of dividing a payload area into time slots in the related art, there is yet no improvement solution.

SUMMARY

The below is a summary of the subject-matter described herein in detail. The summary is not intended to limit the scope of protection of the claims.

Embodiments of the present application provide service transmitting and receiving methods and devices for an OTN, which may avoid the condition of serious bandwidth waste caused by transporting an optical transport service in a manner of dividing a payload area into time slots in the related art.

An embodiment of the present application provides a service transmitting method for an OTN, which may include that: ODU services are mapped into cells of a payload area of an OTN interface frame, where the payload area includes N cells with a fixed size, one cell is used for carrying one ODU service, and N is an integer larger than or equal to 1; and the OTN interface frame is encapsulated and transmitted.

According to another embodiment of the present application, a service receiving method for an OTN is also provided, which may include that: an OTN interface frame is received, where a payload area of the OTN interface frame includes N cells with a fixed size, one cell is used for carrying one ODU service, and N is an integer larger than or equal to 1; and ODU services are demapped from the N cells of the payload area of the OTN interface frame.

According to another embodiment of the present disclosure, a service transmitting device for an OTN is also provided, which may include: a mapping module configured to map an ODU service into cells of a payload area of an OTN interface frame, where the payload area includes N cells with a fixed size, one cell is used for carrying one ODU service, and N is an integer greater than 1; and a transmitting module configured to encapsulate and transmit the OTN interface frame.

According to another embodiment of the present application, a service receiving device for an OTN is also provided, which may include: a receiving module configured to receive an OTN interface frame, where a payload area of the OTN interface frame includes N cells with a fixed size, one cell is used for carrying one ODU service, and N is an integer greater than 1; and a demapping module configured to demap ODU services from the N cells of the payload area of the OTN interface frame.

According to another embodiment of the present application, a storage medium is also provided, in which a computer program may be stored, the computer program being configured to execute, when running, the service transmitting or receiving method for the OTN in the abovementioned embodiments.

According to another embodiment of the present application, an electronic device is also provided, which may include a memory and a processor. A computer program may be stored in the memory. The processor may be configured to run the computer program to execute the service transmitting or receiving method for the OTN in the abovementioned embodiments.

After the drawings and the detailed descriptions are read and understood, other aspects can be understood.

BRIEF DESCRIPTION OF THE DRAWINGS

The drawings described here are adopted to provide a further understanding to the present application and form a part of the present application. Schematic embodiments of the present application and descriptions thereof are adopted to explain the present application and not intended to form improper limits to the present application. In the drawings:

FIG. 1 is a schematic diagram of a frame structure of an OTUk according to the related art;

FIG. 2 is a schematic diagram of the division of an OPUk payload into four time slots in an optical transport standard according to the related art;

FIG. 3 is a hardware structure block diagram of a mobile terminal used for implementing a service transmitting method for an OTN according to an embodiment of the present application;

DETAILED DESCRIPTION OF THE EMBODIMENTS

Figure 4:
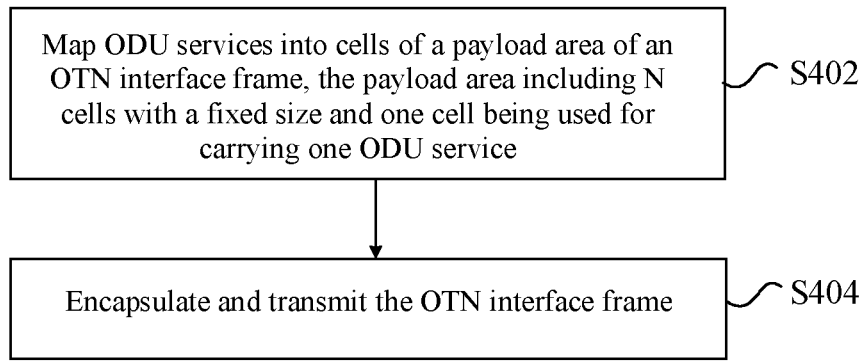
FIG. 4 is a flowchart of a service transmitting method for an OTN according to an embodiment of the present application.

The present application will be described below with reference to the drawings and in combination with the embodiments in detail. It is to be noted that the embodiments in the present application and characteristics in the embodiments may be combined without conflicts.

It is to be noted that terms "first", "second" and the like in the specification, claims and drawings of the present application are adopted not to describe a specific sequence or order but to distinguish similar objects.

Embodiment 1

The method embodiment provided in embodiment 1 of the present application may be executed in a mobile terminal, a computer terminal or a similar computing device. For example, in case of running in the mobile terminal, FIG. 3 is a hardware structure block diagram of a mobile terminal used for implementing a service transmitting method for an OTN according to an embodiment of the present application. As shown in FIG. 3, the mobile terminal 10 may include at least one (only one is shown in FIG. 3) processor 102 (the processor 102 may include, but not limited to, a processing device such as a Micro Controller Unit (MCU) or a Field Programmable Gate Array (FPGA)) and a memory 104 configured to store data. For example, the mobile terminal 10 may further include a transmission device 106 and input/output device 108 configured for a communication function. Those of ordinary skill in the art should know that the structure shown in FIG. 3 is only schematic and not intended to limit the structure of the mobile terminal. For example, the mobile terminal 10 may further include components more or fewer than those shown in FIG. 3 or adopts a configuration different from that shown in FIG. 3.

The memory 104 may be configured to store a computer program like a software program of application software and a module, for example, a computer program corresponding to a service transmitting method for an OTN in the embodiments of the present application. The processor 102 runs the computer program stored in the memory 104, thereby executing various functional applications and data processing, namely implementing the abovementioned method. The memory 104 may include a high-speed Random Access Memory (RAM) and may also include a nonvolatile memory, for example, at least one magnetic storage device, flash memory or other nonvolatile solid-state memory. In some examples, the memory 104 may further include a memory arranged remotely relative to the processor 102, and the remote memory may be connected to the mobile terminal 10 through a network. Examples of the network include, but not limited to, the Internet, an intranet of an enterprise, a local area network, a mobile communication network and a combination thereof.

The transmission device 106 is configured to receive or transmit data through a network. A specific example of the network may include a wireless network provided by a communication provider of the mobile terminal 10. In an example, the transmission device 106 includes a Network Interface Controller (NIC), which may be connected with another network device through a base station, thereby communicating with the Internet. In an example, the transmission device 106 may be a Radio Frequency (RF) module configured to communicate with the Internet in a wireless manner.

The embodiment provides a service transmitting method for an OTN, which runs in the mobile terminal. FIG. 4 is a flowchart of a service transmitting method for an OTN according to an embodiment of the present application. As shown in FIG. 4, the flow includes operations S402 to S404.

In operation S402, ODU services are mapped into cells of a payload area of an OTN interface frame, where the payload area includes N cells with a fixed size, one cell is used for carrying one ODU service and N is an integer larger than or equal to 1.

In operation S404, the OTN interface frame is encapsulated and transmitted.

Through the operations, the payload area of the OTN interface frame is divided into the N cells, the ODUi services are written into the N cells, and the interface frame is transmitted, so that the condition of serious bandwidth waste caused by transporting an optical transport service in a manner of dividing a payload area into time slots in the related art may be avoided, and a bandwidth utilization rate of the OTN may be increased.

In an embodiment, the cells include data cells and control cells, the data cells are configured to carry the ODU services, the control cells are configured to carry control information for mapping the ODU services into the cells, and the control information includes at least one of overhead information and monitoring information.

In an embodiment, each cell includes a cell flag bit and a data field.

In an embodiment, the first bit of each cell is the cell flag bit, and a value of the first bit is 1 or 0, where 1 represents that the cell is a control cell and 0 represents that the cell is a data cell.

In an embodiment, under a condition that the size of the payload area is N times the size of each cell (the size of the payload area may be exactly divided by the size of the cell, namely the size of the payload area is an integer multiple of the size of the cell), the size of each cell is K bits, the size of the payload area is $N*K$, and the bandwidth of each cell is $1/N$ of the bandwidth of the payload area, where K is an integer greater than 1.

Under a condition that the size of the payload area is a sum of F stuff bits and N times of the size of each cell (i.e., the size of the payload area may not be exactly divided by the size of the cell, namely the size of the payload area may not be an integer multiple of the size of the cell), the size of each cell is K bits, the size of the payload area is $N*K+F$, and the bandwidth of each cell is $K/(N*K+F)*$the bandwidth of the payload area, where $F<K$, F is the number of the stuff bits, and the F stuff bits are positioned at the end or middle of the payload area.

In an embodiment, the number of the ODU services is M, the ODU services are numbered as Cj, where j is 1 to M and M is an integer larger than or equal to 1, and the operation that the ODU services are mapped into the cells of the payload area of the OTN interface frame includes that: a predetermined number of cells are allocated to each ODU service, where Sj cells in the N cells is allocated for the j-th ODU service; and the M ODU services are mapped to respective predetermined numbers of cells, where the j-th ODU service is mapped to the Sj cells in the N cells.

In an embodiment, the method further includes that: the number of the predetermined number of cells allocated to each ODU service is determined according to the bandwidth of the ODU service and the bandwidth of each cell, before the operation that the predetermined number of cells are allocated to each ODU service.

In an embodiment, the operation that the predetermined number of cells are allocated to each ODU service includes that: when j=1, the N cells are marked as idle cells, and S1 cells allocated to the first ODU service are uniformly distributed in the N cells according to a sequence of the N cells in the OTN interface frame based on a sigma-delta algorithm; and when j is larger than or equal to 2, the following operation is repeatedly executed until the predetermined number of cells are allocated to each ODU service, where an initial value of j is 2: the Sj cells allocated to the j-th ODU service are uniformly distributed in N-S1-S2-...-S(j-1) idle cells of the N cells according to a sequence of the cells marked to be idle in the OTN interface frame based on the sigma-delta algorithm, j=j+1.

In an embodiment, when the Sj cells allocated to the j-th ODU service are uniformly distributed in the N-S1-S2-...-S(j-1) idle cells of the N cells based on the sigma-delta algorithm, the method further includes that: the rate difference between the bandwidth of the j-th ODU service and the bandwidth of the payload area is carried in a control cell as overhead information.

In an embodiment, in a process that the M ODU services are mapped to respective predetermined numbers of cells, the method further includes that: the cells carrying the ODU services in the N cells are marked as being occupied.

In an embodiment, the operation that the OTN interface frame is encapsulated and transmitted includes that: under a condition that the OTN interface frame is an OTU frame, the signal type of each ODU service and the number of cells occupied by each ODU service are carried in an OPU overhead area of the OTN interface frame, the OTU overhead and the ODU overhead of the OTN interface frame are added to form an OTU frame, and the OTU frame is transmitted; and under a condition that the OTN interface frame is a FlexO frame, the signal type of each ODU service and the number of the cells occupied by each ODU service are carried in a FlexO overhead area of the OTN interface frame, the FlexO overhead, positioning code, and Forward Error Correction (FEC) code of the OTN interface frame are added to form a complete FlexO frame, and the FlexO frame is transmitted.

In an embodiment, the method further includes that: for a service of a non-OTN type, the service of the non-OTN type is converted into the ODU service, before the operation that the ODU service is mapped into the payload area of the OTN interface frame.

The embodiment of the present application also provides an OTN interface frame, which includes a payload area, where the payload area includes N cells with a fixed size, one cell is configured to bear one ODU service, and N is an integer larger than or equal to 1.

In an embodiment, under a condition that a size of the payload area is an integer multiple of the size of the cell, the size of each cell is K bits, the size of the payload area is N*K, and the bandwidth of each cell is 1/N of the bandwidth of the payload area, where K is an integer greater than 1; and under a condition that the size of the payload area is not an integer multiple of the size of the cell, the size of each cell is K bits, the size of the payload area is N*K+F, and the bandwidth of each cell is K/(N*K+F)*the bandwidth of the payload area, where F<K, F is the number of stuff bits, and the F stuff bits are positioned at the end or middle of the payload area.

In an embodiment, the cells include data cells and control cells, the data cells are configured to carry the ODU services, the control cells are configured to carry control information for mapping ODU services into the cells, and the control information includes at least one of overhead information and monitoring information.

In an embodiment, each cell includes a cell flag bit and a data field.

In an embodiment, the first bit of each cell is the cell flag bit, and a value of the first bit is 1 or 0, where 1 represents that the cell is a control cell and 0 represents that the cell is a data cell.

According to the embodiment of the present application, an OTN signal exists in the form of an OTN interface frame, there may be multiple signal rates and frame formats, but a frame in any frame format is a fixed-length frame, and the frame may be divided into two parts, i.e., an overhead area and a payload area.

Figure 5:
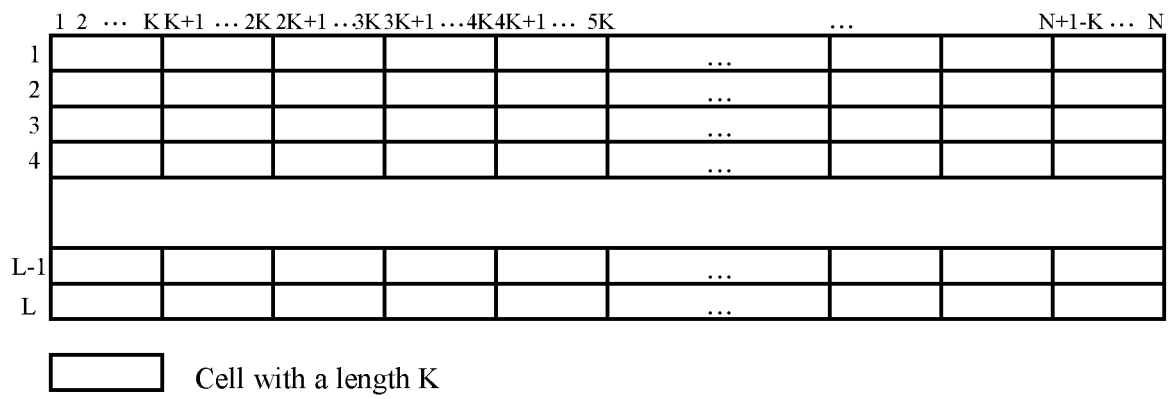
FIG. 5 is a schematic diagram of dividing a payload area of an interface frame according to cells according to an embodiment of the present application.

The concept of a cell is introduced into the payload area of the OTN interface frame. A cell occupies a fixed number of continuous bits. The payload area of the interface frame is divided into N cells with a fixed size (or predetermined sizes), the size of each cell is K bits, and a result of N*K is the total bit number of the payload area of the interface frame. FIG. 5 is a schematic diagram of dividing a payload area of an interface frame according to cells according to an embodiment of the present application. As shown in FIG. 5, a bandwidth of each cell is 1/N of a payload bandwidth of the interface frame. If the payload area may not be exactly divided into an integer number of cells, the payload area is divided according to a maximum cell number, and remaining data of the payload area is filled. Stuff bits corresponding to the remaining data may be positioned at the end of the frame and may also be distributed in the middle of the frame. In such case, the bandwidth of each cell is (K/(N*K+F)*the payload bandwidth of the frame, where F is the number of the stuff bits in a payload of the frame, F<K, and N*K+F is the total bit number of the payload area of the interface frame. Through the embodiment of the present application, the maximum number of services that may be transported through an interface frame is N, and the bandwidth of each cell may also be small, so that the bandwidth utilization rate is increased. A value of K should not be too large, because an excessively large value means that many service bits are required to be cached and a delay is prolonged. The value should also not be too small. Since the cells are divided into two types and some bits are required to be occupied as indicators, an excessively small value means that a proportion of the indicator in the cell is too large. A reasonable value is 129 bits. Of course, another value may also be selected.

When M ODUi services are required to be encapsulated in the payload area of the OTN interface frame, a service number is allocated to each ODUi service at first. The numbers are 1 to M, and the numbers of respective services should not be repeated for other services. There a hypothesis that the number of the j-th service is Cj (j is 1 to M), and the N cells in each frame are allocated in a manner that Sj cells are allocated to respective services. A magnitude of Sj is related to a rate of the ODUi, and if the rate of the ODUi is higher, Sj is larger. Any one of the N cells may be marked as being occupied once being allocated to an ODUi service, and a service number Cj is allocated to the cell. The cell that is not allocated has a service number of 0 and is marked to be idle. The Sj cells allocated to each service are required to be uniformly distributed in the N cells. If the service numbers of all the cells are 0 at present, S1 cells corresponding to the first service are uniformly distributed in the N cells according to a sequence of all the cells of which the service numbers are 0 in the corresponding frame based on a sigma-delta algorithm. For the second service, S2 cells corresponding to the second service are uniformly distributed in the N-S1 cells of which the service numbers are 0 according to a sequence of the other cells of which the service numbers are 0 in the corresponding frame based on the sigma-delta algorithm. The same operations are executed for the other services. The cell includes K bits and is divided into two parts, where one part is a cell type indicator and the other part is cell information. One bit in the K-bit cell may be taken as the cell type indicator. If the cell type indicator is 0, it represents that all of the K−1 bits in the cell bear the service, and if the cell type indicator is 1, it represents that all of the K−1 bits in the cell bear control information. After each service is allocated with the Sj cells corresponding to the service number thereof, since a rate of the Sj cells is higher than the rate of the service, control cells may periodically appear in the cells to compensate for the rate difference between the rate of the service and the rate of the cells allocated thereto, and these control cells act for rate stuff and may also be adopted to transmit additional overheads. For example, for ensuring clock transparency of the service during mapping of the rate of the service to the cell, it is necessary to transport the rate difference between the rate of the service and a payload rate of the OTN interface frame as an overhead such that the rate of the service may be recovered according to the overhead during demapping. The overhead is required to be carried in the control cell.

Figure 6:
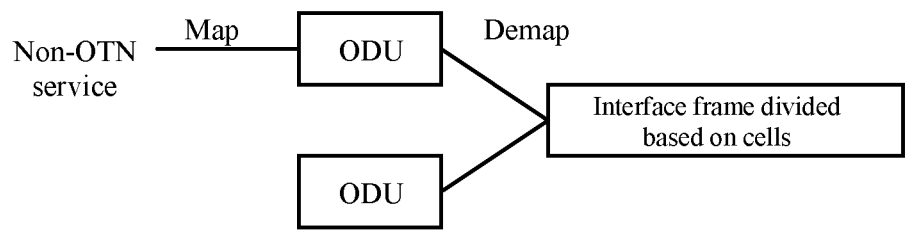
FIG. 6 is a schematic diagram of a service mapping multiplexing path according to an embodiment of the present application.

FIG. 6 is a schematic diagram of a service mapping multiplexing path according to an embodiment of the present application. As shown in FIG. 6, a service of a non-OTN type is mapped to an ODU signal at first according to a conventional mapping manner (AMP, BMP and GMP) and then is mapped into a payload area of an interface frame. A signal of an OTN type is directly mapped into the payload area of the interface frame.

Figure 7:
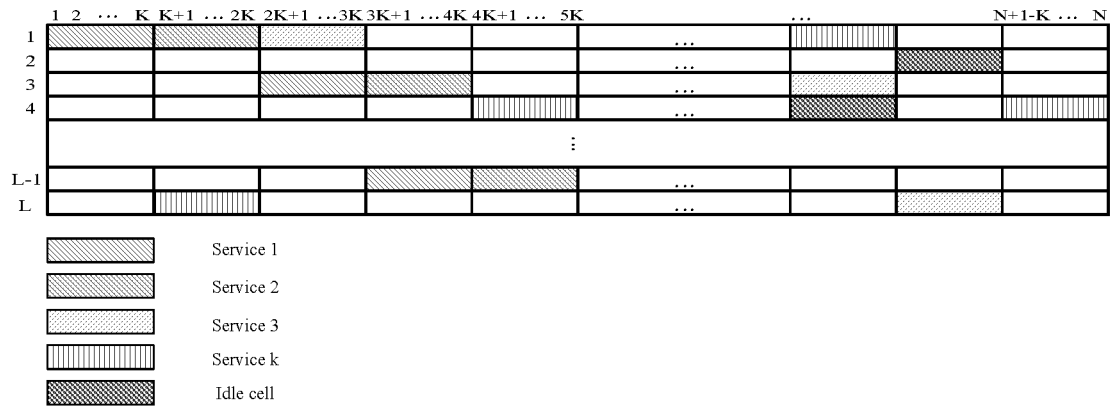
FIG. 7 is a schematic diagram of distribution of multiple paths of ODU signals in a payload area of an interface frame according to an embodiment of the present application.

When M ODUi services are required to be encapsulated in a payload area of an OTN interface frame, a service number is allocated to each ODUi service at first. The numbers are 1 to M, and the number of each service may not be repeated to other services. There a hypothesis that the number of the j-th service is Cj (j is 1 to M), and N cells in each frame are allocated in a manner that Sj cells are allocated to each service. Any one of the N cells may be marked as being occupied once being allocated to an ODUi service, and a service number Cj is allocated to the cell. The cell that is not allocated has a service number of 0 and is marked to be idle. The Sj cells allocated to each service are required to be uniformly distributed in the N cells. If the service numbers of all the cells are 0 at present, S1 cells corresponding to the first service are uniformly distributed in the N cells according to a sequence of all the cells of which the service numbers are 0 in the corresponding frame based on a sigma-delta algorithm. For the second service, S2 cells corresponding to the second service are uniformly distributed in the N-S1 cells of which the service numbers are 0 according to a sequence of the other cells of which the service numbers are 0 in the corresponding frame based on the sigma-delta algorithm. The same operations are executed for the other services. When allocation for all the services is completed, the whole mapping process is completed. FIG. 7 is a schematic diagram of the distribution of multiple paths of ODU signals in a payload area of an interface frame according to an embodiment of the present application. As shown in FIG. 7, a position of each ODU signal in the payload area of each interface frame is fixed.

The overhead information is added into the payload area of the interface frame, the ODU signal type and the number of the occupied cells are carried in the overhead in sequence, and the interface frame is finally transmitted to an opposite end. The interface frame may be of an OTUk type and may also be of a FlexO type.

Embodiment 2

Figure 8:
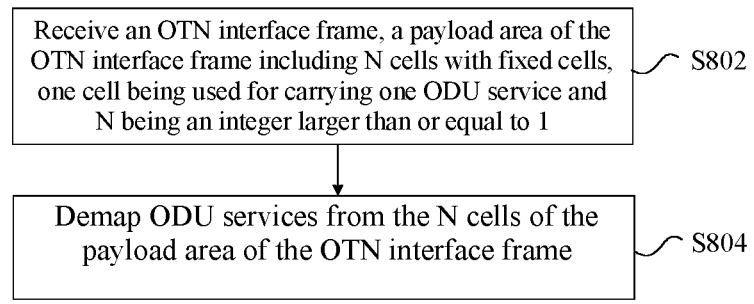
FIG. 8 is a flowchart of a service receiving method for an OTN according to an embodiment of the present application.

According to another embodiment of the present application, a service receiving method for an OTN is also provided. FIG. 8 is a flowchart of a service receiving method for an OTN according to an embodiment of the present application. As shown in FIG. 8, the flow includes S802 to S804.

In S802, an OTN interface frame is received, where a payload area of the OTN interface frame includes N cells with a fixed size, one cell is used for carrying one ODU service, and N is an integer larger than or equal to 1.

In S804, ODU services are demapped from the N cells of the payload area of the OTN interface frame.

Through the operations, ODU services are demapped from the N cells of the payload area of the OTN interface frame, so that the condition of serious bandwidth waste caused by transporting an optical transport service in a manner of dividing a payload area into time slots in the related art may be avoided, and a bandwidth utilization rate of the OTN may be increased.

In an embodiment, the operation that the ODU services are demapped from the N cells of the payload area of the OTN interface frame includes that: the signal type of each ODU service and the number of cells occupied by each ODU service (Sj) are acquired from an overhead area of the OTN interface frame; positions of the Sj cells in the N cells of the payload area are acquired according to the number of the cells occupied by each ODU service (Sj) and the total cell number of the payload area (N); and each ODU service is demapped from the Sj cells according to overhead information of a control cell occupied by the ODU service, where the control cell is configured to carry control information for mapping the ODU service into the cells.

In an embodiment, the operation that the signal type of each ODU service and the number of the cells occupied by each ODU service (Sj) are acquired from the overhead area of the OTN interface frame includes that: under a condition that the OTN interface frame is an OTU frame, the signal type of each ODU service and the number of the cells occupied by each ODU service (Sj) are acquired from an OPU overhead area of the OTN interface frame; and under a condition that the OTN interface frame is a FlexO frame, the signal type of each ODU service and the number of the cells occupied by each ODU service are acquired from a FlexO overhead area of the OTN interface frame.

In an embodiment, the method further includes that: for a service of a non-OTN type, the ODU service is converted into the service of the non-OTN type, after the operation that the ODU services are demapped from the N cells of the payload area of the OTN interface frame.

A method for receiving a service through an OTN includes that: an optical signal is obtained from an optical port to obtain an interface frame that may be of an OTUk type or a FlexO type. Service type information and the number Sj of occupied cells are acquired from an overhead of the interface frame. Positions of Sj cells in N cells of a payload area of the interface frame are acquired according to the number Sj of the cells occupied by an ODUi signal and the total cell number (N) of the payload area of the frame based on a sigma-delta algorithm. The ODUi signal is demapped from the Sj cells according to overhead information of a control cell occupied by the ODUi signal. For a signal of a non-OTN type, an ODU signal is demapped to recover the original data service.

The embodiment of the present application will be described below with specific examples in detail.

Example 1

Two OTN devices transport two Ethernet services of which bandwidths are 5 G through an OTU2, and a cell-based division manner provided in the present application rather than a time-slot-based division manner is adopted for a payload area of the OTU2.

In a first operation, a size of the payload area of the OTU2 is 4*3,808 bytes, a size of a cell is set to be 32 bytes, totally (4*3,808)/32=476 cells may be divided, a bandwidth of each cell is payload bandwidth of the OPU2/476, and all the cells are numbered to be 0. The first bit of each cell is a cell type indicator. If the cell type indicator is 0, it represents all of (32*8−1) bits in the cell bear a service, and if the cell type indicator is 1, it represents all of the (32*8−1) bits in the cell bear control information.

In a second operation, the two 5 GE Ethernet services are mapped to corresponding two ODUflexes at a transmitter, where a bandwidth of each ODUflex is about 5 G.

In a third operation, the number of cells occupied by each ODUflex is calculated according to the bandwidth of the ODUflex and the bandwidth of the cell. In this example, 238 cells are required to be allocated to each ODUflex.

In a fourth operation, 238 cells occupied by the first ODUflex are uniformly distributed in the 476 cells of the payload area of the OPU2 according to a sequence of all the cells of which the service numbers are 0 in the frame based on a sigma-delta algorithm, and the rate difference between the first ODUflex and the payload bandwidth of the PDU2 is carried in a control cell as overhead information. For the second ODUflex, 238 cells corresponding to the second ODUflex are uniformly distributed in the 476-238 cells of which the service numbers are 0 according to a sequence of all the other cells of which the service numbers are 0 in the frame based on the sigma-delta algorithm, and the rate difference between the second ODUflex and the payload bandwidth of the PDU2 is carried in a control cell as overhead information.

In a fifth operation, an OPU2 overhead is added, type information of each ODUflex and the number of the occupied cells are carried in an overhead area of the OPU2, an ODU2 overhead and an OTU2 overhead are added, and encapsulation is performed to obtain the OTU2 for transmitting from the optical port.

In a sixth operation, at a receiver, the OTU2 is acquired from the optical port, and the OPU2 overhead and payload are recovered from the OTU2.

In a seventh operation, the type information of the first ODUflex and the number 238 of the occupied cells are acquired from the OPU2 overhead. Positions of the 238 cells of the first ODUflex in the 476 cells of the payload area of the interface frame are acquired according to the number of the cells occupied by the first ODUflex and the total cell number of the OPU2 payload based on the sigma-delta algorithm. The first ODUflex signal is demapped from the 238 cells according to the overhead information of the control cell occupied by the ODUflex signal. The second ODUflex is acquired in the same manner.

In an eighth operation, the two ODUflexes are demapped to recover the two 5 GE Ethernet services to complete the whole transmission, respectively.

Example 2

One 25 GE Ethernet service and five 5 GE Ethernet services are transported through a 1*50 G FlexO interface.

In a first operation, a size of a payload area of a FlexO frame is (128*5,140−1,280)=656,640 bytes, a size of a cell is set to be 128 bytes, totally 656,640/128=5,130 cells may be divided, a bandwidth of each cell is payload bandwidth of the FlexO/5,130, and all the cells are numbered to be 0. The first bit of each cell is a cell type indicator. If the cell type indicator is 0, it represents all of (128−1) bits in the cell bear a service, and if the cell type indicator is 1, it represents all of the (128−1) bits in the cell bear control information.

In a second operation, at a transmitter, the 25 GE Ethernet service is mapped to a corresponding ODUflex, where a bandwidth of the ODUflex is about 25 G; and each 5 GE Ethernet service is mapped to five corresponding ODUflexes, where a bandwidth of the corresponding ODUflex is about 5 G.

In a third operation, the number of cells occupied by each ODUflex is calculated according to the bandwidth of the ODUflex and the bandwidth of the cell. In this example, the 25 G ODUflex occupies 2,565 cells, and each 5 G ODUflex occupies 513 cells.

In a fourth operation, 2,565 cells occupied by the 25 G ODUflex are uniformly distributed in the 5,130 cells of the payload area of the FlexO according to a sequence of all the cells of which the service numbers are 0 in the frame based on a sigma-delta algorithm. The rate difference between the 25 G ODUflex and the payload bandwidth of the FlexO is carried in a control cell as overhead information. For the first 5 G ODUflex, 513 cells corresponding to the first 5 G ODUflex are uniformly distributed in the 5,130-2,565 cells of which the service numbers are 0 according to a sequence of all the other cells of which the service numbers are 0 in the frame based on the sigma-delta algorithm, and the rate difference between the first ODUflex and the payload bandwidth of the FlexO is carried in a control cell as overhead information. The same operations are executed for the other ODUflexes until all the ODUflexes are encapsulated in the payload area of the FlexO.

In a fifth operation, the FlexO overhead is added, type information of each ODUflex and the number of the occupied cells are carried in an overhead area of the FlexO, an FEC code is added, and encapsulation is performed to obtain the FlexO frame for transmitting from the optical port.

In a sixth operation, at a receiver, the FlexO frame is acquired from the optical port, and the FlexO overhead and payload are recovered from the FlexO frame.

In a seventh operation, the type information of the 25 G ODUflex and the number 2,565 of the occupied cells are acquired from the FlexO overhead. Positions of the 2,565 cells of the 25 G ODUflex in the 5,130 cells of the payload area of the interface frame are acquired according to the number of the cells occupied by the 25 G ODUflex and the total cell number of the FlexO payload based on the sigma-delta algorithm. The 25 G ODUflex signal is demapped from the 2,565 cells according to the overhead information of the control cell occupied by the 25 G ODUflex signal. The other five 5 G ODUflexes are acquired in the same manner.

In an eighth operation, the 25 G ODUflex is demapped to recover the 25 GE Ethernet service, and the five 5 G ODUflexes are demapped to obtain the five 5 GE services, thereby completing the whole transmission.

Through the above descriptions about the implementation modes, those skilled in the art may clearly know that the methods according to the abovementioned embodiments may be implemented in a manner of combining software and a necessary universal hardware platform and, of course, may also be implemented through hardware. Based on such an understanding, the technical solution of the present application substantially or parts making contributions to the related art may be embodied in the form of a software product. The computer software product is stored in a storage medium, for example, a Read Only Memory (ROM)/RAM, a magnetic disk and an optical disk, including a plurality of instructions configured to enable a computer device (which may be a mobile phone, a computer, a server, a network device or the like) to execute the methods in each embodiment of the present application.

Embodiment 3

Figure 9:
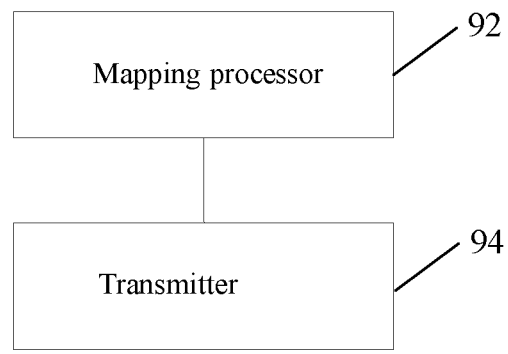
FIG. 9 is a block diagram of a service transmitting device for an OTN according to an embodiment of the present application.

The embodiment also provides a service transmitting device for an OTN, which is configured to implement the abovementioned embodiments and exemplary implementation modes. What has been described will not be elaborated, repeatedly. For example, term "module" used below may be at least one combination of software and hardware capable of realizing a preset function. Although the device described in the following embodiment may be implemented with software, implementation with hardware or a combination of the software and the hardware is also possible and conceivable. FIG. 9 is a block diagram of a service transmitting device for an OTN according to an embodiment of the present application. As shown in FIG. 9, a mapping processor 92 and a transmitter 94 are included in the service transmitting device.

The mapping processor 92 is configured to map an ODU service into cells of a payload area of an OTN interface frame, where the payload area includes N cells with a fixed size, one cell is used for carrying one ODU service, and N is an integer greater than 1.

The transmitter 94 is configured to encapsulate and transmit the OTN interface frame.

In an embodiment, the cells include data cells and control cells, the data cells are configured to carry the ODU services, the control cells are configured to carry control information for mapping ODU services into the cells, and the control information includes at least one of overhead information and monitoring information.

In an embodiment, each cell includes a cell flag bit and a data field.

In an embodiment, the first bit of each cell is the cell flag bit, and a value of the first bit is 1 or 0, where 1 represents that the cell is a control cell and 0 represents that the cell is a data cell.

In an embodiment, under a condition that the payload area is N times the size of each cell, the size of each cell is K bits, the size of the payload area is N*K, and the bandwidth of each cell is 1/N of the bandwidth of the payload area, where K is an integer greater than 1; and under a condition that the size of the payload area is a sum of F stuff bits and N times of the size of each cell, the size of each cell is K bits, the size of the payload area is N*K+F, and the bandwidth of each cell is K/(N*K+F)*the bandwidth of the payload area, where F<K, F is the number of the stuff bits, and the F stuff bits is positioned at the end or middle of the payload area.

In an embodiment, the mapping processor 92 includes: an allocation unit configured to, when the number of the ODU services is M and the ODU services are numbered as Cj, where j is 1 to M and M is an integer larger than or equal to 1, allocate a predetermined number of cells to each ODU service, where Sj cells in the N cells are allocated for the j-th ODU service; and a mapping unit configured to map the M ODU services to respective predetermined numbers of cells, where the j-th ODU service is mapped to the Sj cells in the N cells.

In an embodiment, the device further includes a determination unit configured to, before the operation that the predetermined number of cells are allocated to each ODU service, determine the number of the predetermined number of cells allocated to each ODU service according to the bandwidth of the ODU service and the bandwidth of each cell.

In an embodiment, the allocation unit is further configured to, when j=1, mark the N cells as idle cells and uniformly distribute S1 cells allocated to the first ODU service in the N cells according to a sequence of the N cells in the OTN interface frame based on a sigma-delta algorithm; and when j is larger than or equal to 2, repeatedly execute the following operation until respective predetermined number of cells are allocated to each ODU service, where an initial value of j is 2 (uniformly distributing the Sj cells allocated to the j-th ODU service in N-S1-S2- . . . -S(j−1) idle cells of the N cells according to a sequence of the cells marked to be idle in the OTN interface frame based on the sigma-delta algorithm, j=j+1).

In an embodiment, the device further includes a storage unit configured to, when the Sj cells allocated to the j-th ODU service are uniformly distributed in the N-S1-S2- . . . -S(j−1) idle cells of the N cells based on the sigma-delta algorithm, carry the rate difference between the bandwidth of the j-th ODU service and the bandwidth of the payload area in a control cell as overhead information.

In an embodiment, the device further includes a marking unit configured to, in a process of mapping the M ODU services to respective predetermined numbers of cells, mark the cells carrying the ODU services in the N cells as being occupied.

In an embodiment, the device further includes a first conversion module configured to, before the ODU service is mapped into the payload area of the OTN interface frame, for a service of a non-OTN type, convert the service of the non-OTN type into the ODU service.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 4

Figure 10:
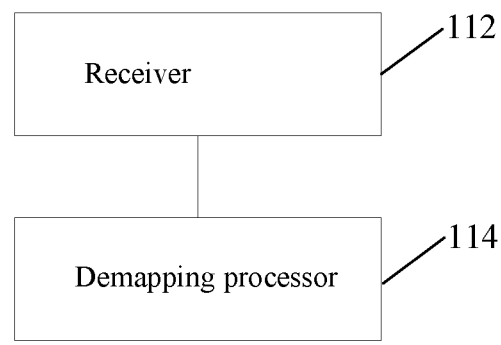
FIG. 10 is a block diagram of a service receiving device for an OTN according to an embodiment of the present application.

The embodiment also provides a service receiving device for an OTN, which is configured to implement the above-mentioned embodiments and exemplary implementation modes. What has been described will not be elaborated, repeatedly. For example, term "module" used below may be at least one combination of software and hardware capable of realizing a preset function. Although the device described in the following embodiment may be implemented with software, implementation with hardware or a combination of the software and the hardware is also possible and conceivable. FIG. 10 is a block diagram of a service receiving device for an OTN according to an embodiment of the present application. As shown in FIG. 10, a receiver 112 and a demapping processor 114 are included in the service receiving device.

The receiver 112 is configured to receive an OTN interface frame, where a payload area of the OTN interface frame includes N cells with a fixed size, one cell is used for carrying one ODU service, and N is an integer greater than 1.

The demapping processor 114 is configured to demap ODU services from the N cells of the payload area of the OTN interface frame.

In an embodiment, the demapping processor 114 includes: an acquisition unit configured to acquire the signal type of each ODU service and the number of cells occupied by each ODU service (Sj) from an overhead area of the OTN interface frame and acquire positions of the Sj cells in the N cells of the payload area according to the number of the cells occupied by each ODU service (Sj) and the total cell number of the payload area (N); and a demapping unit configured to demap each ODU service from the Sj cells according to overhead information of a control cell occupied by the ODU service, where the control cell is configured to carry control information for mapping the ODU service into the cells.

In an embodiment, the acquisition unit is further configured to, under a condition that the OTN interface frame is an OTU frame, acquire the signal type of each ODU service and the number of the cells occupied by each ODU service (Sj) from an OPU overhead area of the OTN interface frame, and under a condition that the OTN interface frame is a FlexO frame, acquire the signal type of each ODU service and the number of the cells occupied by each ODU service from a FlexO overhead area of the OTN interface frame.

In an embodiment, the device further includes a second conversion module configured to, after the ODU services are demapped from the N cells of the payload area of the OTN interface frame, for a service of a non-OTN type, convert the ODU service into the service of the non-OTN type.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 5

The embodiment of the present application also provides a storage medium, in which a computer program is stored, the computer program being configured to execute, when running, the operations in any abovementioned method embodiment.

In an embodiment, the storage medium in the embodiment may be configured to store a computer program configured to execute the following operations:

In a first operation, ODU services are mapped into cells of a payload area of an OTN interface frame, wherein the payload area includes N cells with a fixed size, one cell is used for carrying one ODU service, and N is an integer larger than or equal to 1.

In a second operation, the OTN interface frame is encapsulated and transmitted.

In an embodiment, the storage medium in the embodiment may also be configured to store a computer program configured to execute the following operations:

In a first operation, an OTN interface frame is received, where a payload area of the OTN interface frame includes N cells with a fixed size, one cell is used for carrying one ODU service, and N is an integer larger than or equal to 1.

In a second operation, ODU services are demapped from the N cells of the payload area of the OTN interface frame.

In an embodiment, the storage medium in the embodiment may include, but not limited to, various medium capable of storing computer programs such as a U disk, a ROM, a RAM, a mobile hard disk, a magnetic disk or an optical disk.

The embodiment of the present application also provides an electronic device, which includes a memory and a processor. A computer program is stored in the memory. The processor is configured to run the computer program to execute the operations in any abovementioned method embodiment.

In an embodiment, the electronic device may further include a transmission device and an input/output device. The transmission device is connected with the processor, and the input/output device is connected with the processor.

In an embodiment, the processor in the embodiment may be configured to execute the following operations through the computer program:

In a first operation, ODU services are mapped into cells of a payload area of an OTN interface frame, where the payload area includes N cells with a fixed size, one cell is used for carrying one ODU service, and N is an integer larger than or equal to 1.

In a second operation, the OTN interface frame is encapsulated and transmitted.

In an embodiment, the processor in the embodiment may also be configured to execute the following operations through the computer program:

In a first operation, an OTN interface frame is received, where a payload area of the OTN interface frame includes N cells with a fixed size, one cell is used for carrying one ODU service, and N is an integer larger than or equal to 1.

In a second operation, ODU services are demapped from the N cells of the payload area of the OTN interface frame.

In an embodiment, specific examples in the embodiment may refer to the examples described in the abovementioned embodiments and exemplary implementation modes and will not be elaborated in the embodiment.

Those skilled in the art should know that each module or each step of the present application may be implemented through a universal computing device. They may be concentrated in a single computing device or distributed in a network formed by multiple computing devices. For example, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present application is not limited to any specific hardware and software combination.

What is claimed is:

1. A service transmitting method for an Optical Transport Network (OTN), comprising:
   mapping Optical Data Unit (ODU) services into cells of the payload area of an OTN interface frame, the payload area comprising N cells with a fixed size, one cell being used for carrying one ODU service, and N being an integer larger than or equal to 1; and
   encapsulating and transmitting the OTN interface frame;
   wherein, the number of the cells allocated for the ODU service in each frame is the same;
   wherein the number of ODU services is M, the ODU services are numbered as Cj, j is 1 to M and M is an integer larger than or equal to 1, and mapping the ODU services into the cells of the payload area of the OTN interface frame comprises: allocating a predetermined number of cells among the cells of the payload area to each ODU service, Sj cells in the N cells being allocated for the j-th ODU service; and mapping the M ODU services to respective predetermined numbers of cells, the j-th ODU services being mapped to the Sj cells in the N cells.

2. The method as claimed in claim 1, wherein
the cells comprise data cells and control cells, the data cells are configured to carry the ODU services, the control cells are configured to carry control information for mapping the ODU services into the cells, and the control information comprises at least one of overhead information and monitoring information.

3. The method as claimed in claim 2, wherein
each cell comprises a cell flag bit and a data field.

4. The method as claimed in claim 3, wherein
the first bit of each cell is the cell flag bit, and the value of the first bit is 1 or 0, 1 representing that the cell is a control cell and 0 representing that the cell is a data cell.

5. The method as claimed in claim 1, wherein
under a condition that the payload area is N times a size of each cell, the size of each cell is K bits, the size of the payload area is N*K, and the bandwidth of each cell is 1/N of the bandwidth of the payload area, K being an integer greater than 1; and
under a condition that the size of the payload area is a sum of N times of the size of each cell and F stuff bits, the size of each cell is K bits, the size of the payload area is N*K+F, and the bandwidth of each cell is K/(N*K+F)*the bandwidth of the payload area, F<K, F being the number of the stuff bits, and the F stuff bits being positioned at the end or middle of the payload area.

6. The method as claimed in claim 1, further comprising:
determining the number of the predetermined number of cells allocated to each ODU service according to the bandwidth of the ODU service and the bandwidth of each cell, before allocating the predetermined number of cells to each ODU service.

7. The method as claimed in claim 1, wherein allocating the predetermined number of cells to each ODU service comprises:

when j=1, marking the N cells as idle cells and uniformly distributing S1 cells allocated to the first ODU service in the N cells according to a sequence of the N cells in the OTN interface frame based on a sigma-delta algorithm; and when j is larger than or equal to 2, repeatedly executing the following operation until respective predetermined number of cells are allocated to each ODU service, where an initial value of j is 2: uniformly distributing the Sj cells allocated to the j-th ODU service in N-S1-S2- . . . -S(j−1) idle cells of the N cells according to a sequence of the cells marked to be idle in the OTN interface frame based on the sigma-delta algorithm, j=j+1.

8. The method as claimed in claim 7, when the Sj cells allocated to the j-th ODU service are uniformly distributed in the N-S1-S2- . . . -S(j−1) idle cells of the N cells based on the sigma-delta algorithm, further comprising:

carrying the rate difference between the bandwidth of the j-th ODU service and the bandwidth of the payload area in a control cell as overhead information.

9. The method as claimed in claim 6, mapping the M ODU services to respective predetermined numbers of cells, further comprising:

marking the cells carrying the ODU services in the N cells as being occupied.

10. The method as claimed in claim 1, wherein encapsulating and transmitting the OTN interface frame comprises:

under a condition that the OTN interface frame is an Optical Transport Unit (OTU) frame, carrying the signal type of each ODU service and the number of cells occupied by each ODU service in an Optical Payload Unit (OPU) overhead area of the OTN interface frame, adding an OTU overhead and an ODU overhead of the OTN interface frame to form an OTU frame, and transmitting the OTU frame; and under a condition that the OTN interface frame is a Flexible OTN (FlexO) frame, carrying the signal type of each ODU service and the number of the cells occupied by each ODU service in the FlexO overhead area of the OTN interface frame, adding the FlexO overhead, positioning code and Forward Error Correction (FEC) code of the OTN interface frame to form a complete FlexO frame, and transmitting the FlexO frame.

11. The method as claimed in claim 1, further comprising:

for a service of a non-OTN type, converting the service of the non-OTN type into the ODU service, before mapping the ODU services into the payload area of the OTN interface frame.

12. A service receiving method for an Optical Transport Network (OTN), comprising:

receiving an OTN interface frame, the payload area of the OTN interface frame comprising N cells with a fixed size, one cell carrying one Optical Data Unit (ODU) service, and N being an integer larger than or equal to 1; and demapping ODU services from the N cells of the payload area of the OTN interface frame;

wherein, the number of the cells allocated for the ODU service in each frame is the same;

wherein the number of ODU services is M, the ODU services are numbered as Cj, j is 1 to M and M is an integer larger than or equal to 1, and the ODU services are mapped into the cells of the payload area of the OTN interface frame according to the following method: allocating a predetermined number of cells among the cells of the payload area to each ODU service, Sj cells in the N cells being allocated for the j-th ODU service; and mapping the M ODU services to respective predetermined numbers of cells, the j-th ODU services being mapped to the Sj cells in the N cells.

13. The method as claimed in claim 12, wherein demapping the ODU services from the N cells of the payload area of the OTN interface frame comprises:

acquiring the signal type of each ODU service and the number of cells occupied by each ODU service (Sj) from the overhead area of the OTN interface frame;

acquiring positions of Sj cells in the N cells of the payload area according to the number of the cells occupied by each ODU service (Sj) and the total cell number of the payload area (N); and demapping each ODU service from the Sj cells according to overhead information of the control cell occupied by the ODU service, the control cell being configured to carry control information for mapping the ODU service into the Sj cells.

14. The method as claimed in claim 13, wherein acquiring the signal type of each ODU service and the number of the cells occupied by each ODU service (Sj) from the overhead area of the OTN interface frame comprises:

under a condition that the OTN interface frame is an Optical Transport Unit (OTU) frame, acquiring the signal type of each ODU service and the number of the cells occupied by each ODU service (Sj) from the Optical Payload Unit (OPU) overhead area of the OTN interface frame; and under a condition that the OTN interface frame is a Flexible OTN (FlexO) frame, acquiring the signal type of each ODU service and the number of the cells occupied by each ODU service from the FlexO overhead area of the OTN interface frame.

15. The method as claimed in claim 12, comprising:

for a service of a non-OTN type, converting the ODU service into the service of the non-OTN type, after demapping the ODU services from the N cells of the payload area of the OTN interface frame.

16. A service transmitting device for an Optical Transport Network (OTN), comprising:

a mapping processor, configured to map Optical Data Unit (ODU) services into cells of the payload area of an OTN interface frame, the payload area comprising N cells with a fixed size, one cell being used for carrying one ODU service, and N being an integer greater than 1; and a transmitter, configured to encapsulate and transmit the OTN interface frame;

wherein, the number of the cells allocated for the ODU service in each frame is the same;

wherein the mapping processor comprises: an allocation unit, configured to, when the number of ODU services is M the ODU services are numbered as Cj, j being 1 to M and M is an integer larger than or equal to 1, allocate a predetermined number of cells among the cells of the payload area to each ODU service, Sj cells in the N cells being allocated for the j-th ODU service; and a mapping unit, configured to map the M ODU services to respective predetermined numbers of cells, the j-th ODU services being mapped to the Sj cells in the N cells.

17. A service receiving device for an Optical Transport Network (OTN), comprising:

a receiver, configured to receive an OTN interface frame, the payload area of the OTN interface frame comprising N cells with a fixed size, one cell carrying one Optical Data Unit (ODU) service, and N being an integer greater than 1; and a demapping processor, configured to demap ODU services from the N cells of the payload area of the OTN interface frame;

wherein, the number of the cells allocated for the ODU service in each frame is the same;

wherein the number of ODU services is M, the ODU services are numbered as Cj, j is 1 to M and M is an integer larger than or equal to 1, and the ODU services are mapped into the cells of the payload area of the OTN interface frame according to the following method: allocating a predetermined number of cells among the cells of the payload area to each ODU service, Sj cells in the N cells being allocated for the j-th ODU service; and mapping the M ODU services to respective predetermined numbers of cells, the j-th ODU services being mapped to the Sj cells in the N cells.

18. A non-transitory storage medium, in which a computer program is stored, the computer program being configured to execute, when running, the service transmitting or receiving method for the Optical Transport Network (OTN) as claimed in claim 1.

19. An electronic device, comprising a memory and a processor, wherein a computer program is stored in the memory; and the processor is configured to run the computer program to execute the service transmitting or receiving method for the Optical Transport Network (OTN) as claimed in claim 1.

* * * * *